United States Patent
Jito et al.

(10) Patent No.: US 9,437,869 B2
(45) Date of Patent: Sep. 6, 2016

(54) POSITIVE ELECTRODE FOR NONAQUEOUS ELECTROLYTE SECONDARY BATTERY AND NONAQUEOUS ELECTROLYTE SECONDARY BATTERY USING THE POSITIVE ELECTRODE

(75) Inventors: Daizo Jito, Kobe (JP); Takeshi Ogasawara, Kobe (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 525 days.

(21) Appl. No.: 13/992,944

(22) PCT Filed: Sep. 21, 2011

(86) PCT No.: PCT/JP2011/071484
§ 371 (c)(1),
(2), (4) Date: Jul. 24, 2013

(87) PCT Pub. No.: WO2012/086277
PCT Pub. Date: Jun. 28, 2012

(65) Prior Publication Data
US 2013/0302689 A1    Nov. 14, 2013

(30) Foreign Application Priority Data
Dec. 20, 2010   (JP) .................... 2010-282644

(51) Int. Cl.
*H01M 4/36* (2006.01)
*H01M 4/131* (2010.01)
(Continued)

(52) U.S. Cl.
CPC ............ *H01M 4/366* (2013.01); *H01M 4/131* (2013.01); *H01M 4/364* (2013.01); (Continued)

(58) Field of Classification Search
CPC .... H01M 4/364; H01M 4/131; H01M 4/366; H01M 4/505; H01M 4/525; H01M 10/052; H01M 4/62; Y02E 60/122
See application file for complete search history.

(56) References Cited

U.S. PATENT DOCUMENTS

| | | |
|---|---|---|
| 2005/0266315 A1 | 12/2005 | Sato et al. |
| 2006/0105240 A1 | 5/2006 | Kinoshita et al. |

(Continued)

FOREIGN PATENT DOCUMENTS

| | | |
|---|---|---|
| CN | 101267051 A | 9/2008 |
| CN | 101807714 A | 8/2010 |

(Continued)

OTHER PUBLICATIONS

Chinese Office Action dated Dec. 1, 2014, issued in Chinese Application No. 201180061601.8. (6 pages).

(Continued)

*Primary Examiner* — Laura Weiner
(74) *Attorney, Agent, or Firm* — Westerman, Hattori, Daniels & Adrian, LLP

(57) ABSTRACT

It is an object of the present invention to provide a positive electrode for nonaqueous electrolyte secondary batteries that can suppress decreases in the discharge capacity and discharge voltage even when continuous charging is performed at high temperature and that can also suppress decreases in the discharge voltage and energy density even in the charge and discharge after the continuous charging, and to provide a nonaqueous electrolyte secondary battery that uses the positive electrode. The positive electrode includes a positive electrode active material composed of a mixture containing lithium cobalt oxide 21 having a surface to which an erbium compound 22 is partly adhered and lithium nickel cobalt manganese oxide and a binder. The content of the lithium nickel cobalt manganese oxide is 1% by mass or more and 50% by mass or less relative to the total amount of the positive electrode active material.

13 Claims, 3 Drawing Sheets

(51) Int. Cl.
    *H01M 4/505*       (2010.01)
    *H01M 4/525*       (2010.01)
    *H01M 2/16*         (2006.01)
    *H01M 4/62*         (2006.01)
    *H01M 10/052*     (2010.01)

(52) U.S. Cl.
    CPC .......... *H01M 2/1673* (2013.01); *H01M 4/505* (2013.01); *H01M 4/525* (2013.01); *H01M 4/62* (2013.01); *H01M 10/052* (2013.01); *Y02E 60/122* (2013.01); *Y02T 10/7011* (2013.01)

(56) References Cited

U.S. PATENT DOCUMENTS

| | | |
|---|---|---|
| 2008/0226988 A1 | 9/2008 | Minami et al. |
| 2008/0318131 A1 | 12/2008 | Watanabe et al. |
| 2009/0233176 A1 | 9/2009 | Kita et al. |
| 2010/0209774 A1 | 8/2010 | Minami et al. |
| 2010/0248035 A1 | 9/2010 | Minami et al. |
| 2011/0076571 A1* | 3/2011 | Matsumoto ............ H01M 4/13 429/326 |
| 2011/0117434 A1* | 5/2011 | Ogasawara ........... H01M 4/131 429/223 |
| 2011/0206977 A1 | 8/2011 | Ikeda |

FOREIGN PATENT DOCUMENTS

| | | |
|---|---|---|
| JP | 04-319259 A | 11/1992 |
| JP | 06-150928 A | 5/1994 |
| JP | 2005-196992 A | 7/2005 |
| JP | 3712251 B2 | 11/2005 |
| JP | 2005-339886 A | 12/2005 |
| JP | 2005-339970 A | 12/2005 |
| JP | 2006-147191 A | 6/2006 |
| JP | 2007-280917 A | 10/2007 |
| JP | 2008-234872 A | 10/2008 |
| JP | 2009-004316 A | 1/2009 |
| JP | 2009-302009 A | 12/2009 |
| JP | 2010-113966 A | 5/2010 |
| JP | 2010-238464 A | 10/2010 |
| WO | 2007/072759 A1 | 6/2007 |
| WO | 2010/004973 A1 | 1/2010 |
| WO | 2010/015368 A1 | 2/2010 |

OTHER PUBLICATIONS

International Search Report of PCT/JP2011/071484, mailing date of Dec. 6, 2011.

Office Action of Japanese application 2012-547351, mailing date of Jan. 16, 2013.

Office Action of Japanese application 2012-547351, mailing date of Apr. 10, 2013.

Office Action dated Jun. 16, 2015, issued in counterpart Japanese Patent Application No. 2013-133437 (4 pages).

* cited by examiner

POSITIVE ELECTRODE FOR NONAQUEOUS ELECTROLYTE SECONDARY BATTERY AND NONAQUEOUS ELECTROLYTE SECONDARY BATTERY USING THE POSITIVE ELECTRODE

TECHNICAL FIELD

The present invention relates to a positive electrode for nonaqueous electrolyte secondary batteries and a nonaqueous electrolyte secondary battery that uses the positive electrode.

BACKGROUND ART

In recent years, portable information terminals such as cellular phones, laptop computers, and PDAs have become increasingly smaller and more light-weight, and higher capacity has been required for batteries serving as driving power sources for portable information terminals. Lithium-ion batteries, which are charged and discharged through movement of lithium ions between the positive and negative electrodes, have high energy density and high capacity and thus are widely used as the driving power sources for the above portable information terminals.

As portable information terminals have been made to have greater functionality such as video-replaying functions and game functions, there has been a trend toward a further increase in the power consumption of portable information terminals. Thus, a further increase in the capacity of batteries has been strongly demanded. Examples of methods for increasing the capacity of nonaqueous electrolyte secondary batteries include a method for increasing the capacity of the active material, a method for increasing the amount of active material packed per unit volume, and a method for increasing the charge voltage of a battery. However, when the charge voltage of a battery is increased, the electrolyte tends to decompose. In particular, when such a battery is stored at high temperature or is repeatedly subjected to a charging-discharging cycle at high temperature, problems such as a decrease in the discharge capacity are caused.

In view of the foregoing, as described below, it has been proposed that a mixture of lithium cobalt oxide and lithium nickel cobalt manganese oxide be used as a positive electrode active material.

(1) There has been proposed a nonaqueous secondary battery including a positive electrode, a negative electrode, and an electrolyte, wherein the positive electrode contains at least $Li_xCoO_2$ and $Li_yNi_sCo_tM_uO_2$ (M is B, Mg, or the like) as positive electrode active materials, and the content of $Li_yNi_sCo_tM_uO_2$ is 10% to 45% by mass relative to the total amount of $Li_xCoO_2$ and $Li_yNi_sCo_tM_uO_2$ (refer to PTL 1 below).

(2) There has been proposed a mixture that contains a lithium-cobalt composite oxide obtained by dissolving a first minor component selected from Al and Fe and a second minor component selected from Zr and Ti and a lithium-nickel-cobalt-manganese oxide at a ratio of 95:5 to 70:30 (refer to PTL 2 below).

(3) There has been proposed coating of a surface of a positive electrode active material with a compound (refer to PTL 3 below).

CITATION LIST

Patent Literature

PTL 1: Japanese Patent No. 3712251
PTL 2: Japanese Published Unexamined Patent Application No. 2008-234872
PTL 3: WO2010/004973A1

SUMMARY OF INVENTION

Technical Problem

However, even when the above proposals (1) to (3) are employed, decomposed products are formed due to the reaction between a positive electrode and an electrolyte and a positive electrode active material is decomposed or eluted. In particular, when a battery is exposed at high temperature for a long time in a charged state, such problems remarkably occur. Therefore, the characteristics of nonaqueous electrolyte secondary batteries cannot be sufficiently improved.

Solution to Problem

In the present invention, a positive electrode active material composed of a mixture containing lithium cobalt oxide having a surface to which a rare-earth compound is partly adhered and lithium nickel cobalt manganese oxide and a binder are included, and the content of the lithium nickel cobalt manganese oxide is 1% by mass or more and 50% by mass or less relative to the total amount of the positive electrode active material.

Advantageous Effects of Invention

According to the present invention, there can be produced excellent effects of suppressing decreases in the discharge capacity and discharge voltage even when continuous charging is performed at high temperature and also suppressing decreases in the discharge voltage and energy density even in the charge and discharge after the continuous charging.

DESCRIPTION OF EMBODIMENTS

Figure 1:
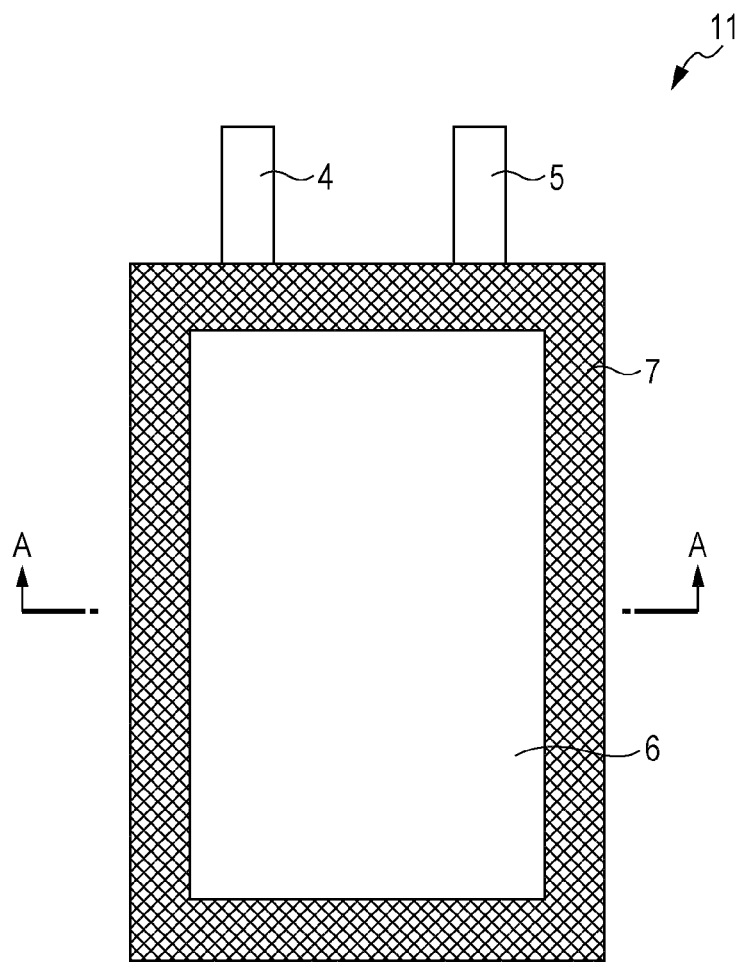
FIG. 1 is a front view of a nonaqueous electrolyte secondary battery according to an embodiment of the present invention.

In the present invention, a positive electrode active material composed of a mixture containing lithium cobalt oxide having a surface to which a rare-earth compound is partly adhered and lithium nickel cobalt manganese oxide and a binder are included. The content of the lithium nickel cobalt manganese oxide is 1% by mass or more and 50% by mass or less relative to the total amount of the positive electrode active material.

In the above structure, for example, even when a battery in a charged state is exposed in a high-temperature environment, the decomposition of an electrolyte and the degradation of a positive electrode active material can be suppressed. Thus, the degradation of discharge performance can be suppressed. The reason for this is unclear, but is assumed to be as follows.

When lithium cobalt oxide having an exposed surface and lithium nickel cobalt manganese oxide are mixed with each other, the lithium nickel cobalt manganese oxide is further activated due to high catalytic performance of the lithium cobalt oxide. Therefore, in particular, when a battery in a charged state (high voltage) is exposed in a high-temperature environment, cobalt, nickel, and manganese are eluted from the positive electrode active material or an electrolyte is decomposed and the decomposed product adheres to the surface of the positive electrode active material. As a result, an inactive layer is formed on the surface of the positive electrode active material, which considerably degrades the discharge performance.

In contrast, when lithium cobalt oxide having a surface to which a rare-earth compound is partly adhered is used, the catalytic performance of cobalt in the lithium cobalt oxide is degraded due to the presence of the rare-earth compound. Because of the effect of the degraded catalytic performance on lithium nickel cobalt manganese oxide, an effect of suppressing the elution of nickel, cobalt, and manganese is produced. Furthermore, as a result of suppressing the activation of the lithium nickel cobalt manganese oxide in such a manner, the activation of the lithium cobalt oxide can be further suppressed and thus the decomposition of an electrolyte can be further suppressed. Such a combined effect can suppress the formation of an inactive layer on the surface of the positive electrode active material. Consequently, the discharge performance is markedly improved.

As described above, when a rare-earth compound is partly adhered to a surface of lithium cobalt oxide and a positive electrode active material obtained by mixing the lithium cobalt oxide and lithium nickel cobalt manganese oxide with each other is used, the decomposition of an electrolyte and the elution of metals in the positive electrode active material can be effectively suppressed. Therefore, high discharge capacity can be achieved and the decrease in discharge voltage can be suppressed even after continuous charging is performed at high temperature, and thus a battery having high energy density even after exposed in a severe environment can be provided.

Figure 3:
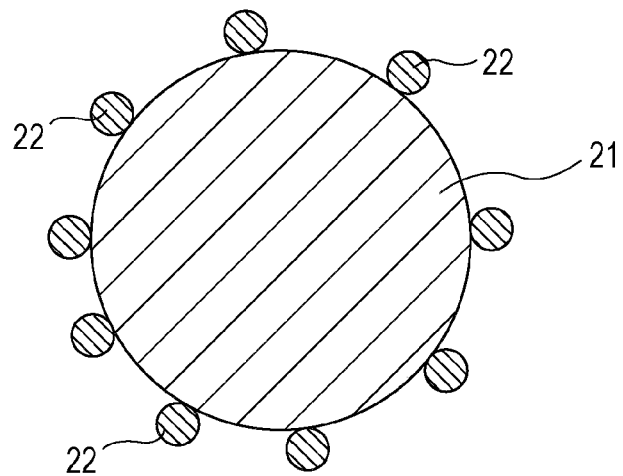
FIG. 3 is an explanatory view showing a surface state of lithium cobalt oxide used in the embodiment of the present invention.
Figure 4:
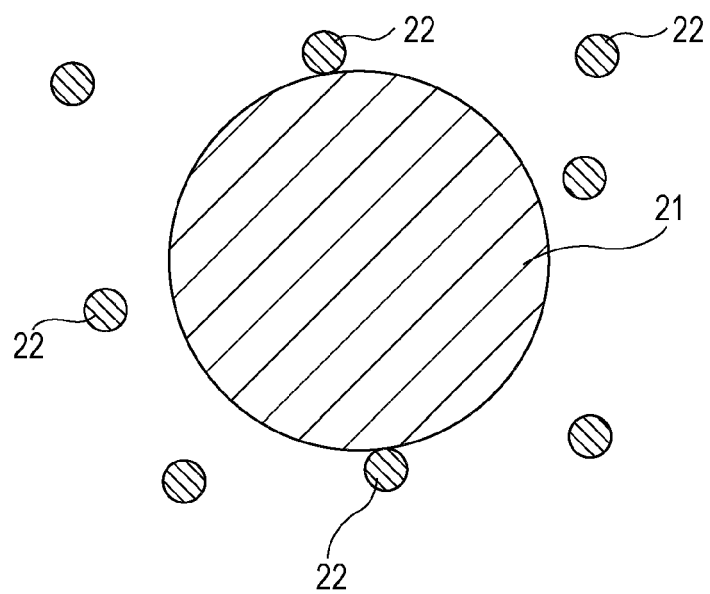
FIG. 4 is an explanatory view showing a surface state different from the surface state of lithium cobalt oxide used in the embodiment of the present invention.

The state in which a rare-earth compound is partly adhered to a surface of lithium cobalt oxide means a state in which, as shown in FIG. 3, most of rare-earth compound particles 22 (i.e., all rare-earth compound particles except for rare-earth compound particles that come off by external forces during the production of a positive electrode) are adhered to a surface of each of lithium cobalt oxide particles 21. In other words, the state does not include a state in which, as shown in FIG. 4, lithium cobalt oxide particles 21 and rare-earth compound particles 22 are simply mixed with each other and some of the rare-earth compound particles 22 are in contact with each of the lithium cobalt oxide particles 21 by chance. The rare-earth compound means a compound containing at least one element selected from the group consisting of rare-earth elements. Examples of the rare-earth compound include an erbium compound (erbium hydroxide or erbium oxyhydroxide) alone and a mixture of an erbium compound and an yttrium compound (yttrium hydroxide or yttrium oxyhydroxide).

The content of the lithium nickel cobalt manganese oxide is limited to 1% by mass or more and 50% by mass or less relative to the total amount of the positive electrode active material because of the following reason.

If the content of the lithium nickel cobalt manganese oxide is less than 1% by mass relative to the total amount of the positive electrode active material, the amount of lithium cobalt oxide is excessively increased. Therefore, even when the rare-earth compound is partly adhered to the surface, the amount of electrolyte decomposed is increased, which may decrease the discharge voltage. If the content of the lithium nickel cobalt manganese oxide is more than 50% by mass relative to the total amount of the positive electrode active material, the content of the lithium nickel cobalt manganese oxide is excessively increased and the activation of the lithium nickel cobalt manganese oxide sometimes cannot be sufficiently suppressed.

In view of the foregoing, the content of the lithium nickel cobalt manganese oxide is preferably 3% by mass or more and 30% by mass or less and particularly preferably 5% by mass or more and 20% by mass or less relative to the total amount of the positive electrode active material.

The lithium nickel cobalt manganese oxide preferably has a surface to which a rare-earth compound is partly adhered.

When the rare-earth compound is partly adhered to not only the surface of the lithium cobalt oxide but also the surface of the lithium nickel cobalt manganese oxide, the capacity retention ratio after continuous charging is performed at high temperature is further increased. The reason for this is as follows. The lithium nickel cobalt manganese oxide also contains cobalt, nickel, and the like and thus an electrolyte may be decomposed. However, by partly adhering the rare-earth compound on the surface, the decomposition reaction of an electrolyte that occurs on the surface of the lithium nickel cobalt manganese oxide can be suppressed.

The rare-earth compound preferably has an average particle size of 100 nm or less.

In the case where the rare-earth compound (that includes not only a rare-earth compound partly adhered to the surface of lithium cobalt oxide but also a rare-earth compound partly adhered to the surface of lithium nickel cobalt manganese oxide) has an average particle size of more than 100 nm, even if the rare-earth compound with the same mass is adhered, the rare-earth compound is unevenly adhered at particular positions. Therefore, the above-described effect sometimes cannot be sufficiently produced.

The lower limit of the average particle size of the rare-earth compound is preferably 0.1 nm or more and particularly preferably 1 nm or more. If the rare-earth compound has an average particle size of less than 0.1 nm, the rare-earth compound is excessively small and excessively covers the surface of the positive electrode active material.

The rare-earth compound is preferably at least one selected from the group consisting of rare-earth hydroxides, rare-earth oxyhydroxides, and rare-earth carbonate compounds.

A rare-earth element of the rare-earth compound is preferably at least one element selected from erbium, neodymium, samarium, and lanthanum. Furthermore, the rare-earth compound is preferably at least one selected from hydroxides (e.g., erbium hydroxide), oxyhydroxides (e.g., erbium oxyhydroxide), and carbonate compounds (e.g., erbium carbonate) of at least one element selected from erbium, neodymium, samarium, and lanthanum.

The use of such a compound increases the effect of suppressing the activity on the surface of the lithium cobalt oxide. When such a compound is used for both the lithium cobalt oxide and lithium nickel cobalt manganese oxide, the effect is further increased.

There are included the above-described positive electrode for nonaqueous electrolyte secondary batteries (hereinafter may be simply referred to as a positive electrode), a negative electrode containing a negative electrode active material, and a separator disposed between both the electrodes and impregnated with an electrolyte.

An inorganic particle layer containing inorganic particles is preferably formed between the separator and the positive electrode.

This is because, when an inorganic particle layer containing inorganic particles is formed between the separator and the positive electrode, the contact between the positive electrode active material and the electrolyte can be further suppressed and thus the decomposition of the electrolyte can be further suppressed. In this case, the inorganic particle layer is formed by directly applying a slurry containing inorganic particles onto a surface of the positive electrode or a surface of the separator on the positive electrode side. Alternatively, the inorganic particle layer may be formed by attaching a sheet formed of inorganic particles to a surface of the positive electrode or a surface of the separator on the positive electrode side.

The thickness of the inorganic particle layer is preferably limited to 1 μm or more and 10 μm or less. The reason for this is as follows. If the thickness is less than 1 μm, the surface of the positive electrode cannot be sufficiently covered with the inorganic particle layer, which may produce an insufficient effect of suppressing the reaction between the positive electrode active material and the electrolyte. If the thickness is more than 10 μm, the amounts of active materials in the positive and negative electrodes are decreased by the thickness that exceeds 10 μm, which may decrease the battery capacity.

Examples of the inorganic particles include known oxides that contain titanium, aluminum, silicon, magnesium, and the like alone or in combination; phosphate compounds; and compounds obtained by surface-treating the oxides or phosphate compounds with a hydroxide or the like.

The inorganic particle layer is preferably formed on a surface of the positive electrode.

This is because, when the inorganic particle layer is directly formed on a surface of the positive electrode, the contact between the positive electrode active material and the electrolyte can be further suppressed and thus the decomposition of the electrolyte can be considerably suppressed.

An inorganic particle layer containing inorganic particles is preferably formed between the separator and the negative electrode.

This is because, when an inorganic particle layer containing inorganic particles is formed between the separator and the negative electrode, the contact between the negative electrode active material and the electrolyte can be further suppressed and thus the decomposition of the electrolyte can be further suppressed. In this case, the inorganic particle layer is formed by directly applying a slurry containing inorganic particles onto a surface of the negative electrode or a surface of the separator on the negative electrode side. Alternatively, the inorganic particle layer may be formed by attaching a sheet formed of inorganic particles to a surface of the negative electrode or a surface of the separator on the negative electrode side.

The thickness of the inorganic particle layer is preferably limited to 1 μm or more and 10 μm or less. The reason for this is as follows. If the thickness is less than 1 μm, the surface of the positive electrode cannot be sufficiently covered with the inorganic particle layer, which may produce an insufficient effect of suppressing the reaction between the negative electrode active material and the electrolyte. If the thickness is more than 10 μm, the amounts of active materials in the positive and negative electrodes are decreased by the thickness that exceeds 10 μm, which may decrease the battery capacity.

The same inorganic particles as those of the above-described inorganic particle layer disposed between the separator and the positive electrode can be used. In addition, the inorganic particle layer can be formed between the separator and the positive electrode and between the separator and the negative electrode.

The inorganic particle layer is preferably formed on a surface of the negative electrode.

This is because, when the inorganic particle layer is directly formed on a surface of the negative electrode, the contact between the negative electrode active material and the electrolyte can be further suppressed and thus the decomposition of the electrolyte can be considerably suppressed.

(Other Matters)

(1) Examples of a method for partly adhering a rare-earth compound on surfaces of lithium cobalt oxide and lithium nickel cobalt manganese oxide include a method in which a solution containing a rare-earth compound dissolved therein is mixed with a solution containing such positive electrode active material powders dispersed therein and a method in which a solution containing a rare-earth compound is sprayed while such positive electrode active material powers are mixed.

By employing such a method, a rare-earth hydroxide can be partly adhered to surfaces of lithium cobalt oxide and lithium nickel cobalt manganese oxide. When the lithium cobalt oxide and the like are heat-treated, the rare-earth hydroxide partly adhered to the surfaces changes into a rare-earth oxyhydroxide or a rare-earth oxide. If a carbon dioxide atmosphere is employed when the hydroxide is adhered or a positive electrode active material powder is dispersed in a solution containing carbon dioxide dissolved therein, a rare-earth carbonate compound can be mainly provided.

Examples of a rare-earth compound dissolved in a solution used when the rare-earth hydroxide or the rare-earth carbonate compound is adhered include rare-earth acetates, rare-earth nitrates, rare-earth sulfates, rare-earth oxides, and rare-earth chlorides.

The rare-earth compound is preferably at least one selected from rare-earth hydroxides, rare-earth oxyhydroxides, and rare-earth carbonate compounds. That is, a rare-earth oxide is preferably not included. The reason for this is as follows.

When a compound having a surface to which a rare-earth hydroxide or a rare-earth carbonate compound is adhered is heat-treated, they change into an oxyhydroxide or an oxide. In general, the temperature at which a rare-earth hydroxide or a rare-earth oxyhydroxide stably changes into an oxide is 500° C. or more. However, if a heat treatment is performed at such a temperature, part of the rare-earth compound adhered to the surface diffuses into the positive electrode active material. As a result, an effect of suppressing the decomposition reaction of the electrolyte on the surface of the positive electrode active material may be decreased.

(2) The amount of the rare-earth compound partly adhered to the surface of lithium cobalt oxide is preferably 0.01% by mass or more and less than 0.5% by mass relative to the amount of the lithium cobalt oxide on a rare-earth element basis. If the amount is less than 0.01% by mass, the amount of the rare-earth compound adhered to the surface is excessively small and thus an adhering effect of the rare-earth compound is sometimes not sufficiently produced. If the amount is more than 0.5% by mass, the surface of the lithium cobalt oxide is excessively covered with a compound that negligibly contributes to a charge and discharge reaction in a direct manner, which may decrease the discharge performance. The amount of the rare-earth compound adhered is more preferably 0.3% by mass or less. By limiting the amount in such a manner, not only the adhering effect of the rare-earth compound but also high discharge performance can be provided.

The amount of the rare-earth compound partly adhered to the surface of lithium nickel cobalt manganese oxide is preferably 0.01% by mass or more and 0.8% by mass or less relative to the amount of the lithium nickel cobalt manganese oxide on a rare-earth element basis. If the amount is less than 0.01% by mass, the amount of the rare-earth compound adhered to the surface is excessively small and thus an adhering effect of the rare-earth compound is sometimes not sufficiently produced. If the amount is more than 0.8% by mass, the surface of the lithium nickel cobalt manganese oxide is excessively covered with a compound that negligibly contributes to a charge and discharge reaction in a direct manner, which may decrease the discharge performance. The amount of the rare-earth compound adhered is more preferably 0.3% by mass or less. By limiting the amount in such a manner, not only the adhering effect of the rare-earth compound but also high discharge performance can be provided.

(3) In the lithium cobalt oxide, a substance such as Al, Mg, Ti, or Zr may be contained as solid-solution or may be contained in grain boundaries. In addition to the rare-earth compound, a compound of Al, Mg, Ti, Zr, or the like may also be adhered to the surface of the lithium cobalt oxide. This is because, also in the case where such a compound is adhered, the contact between the electrolyte and the positive electrode active material can be suppressed.

(4) A lithium nickel cobalt manganese oxide having a public known composition with a molar ratio of nickel, cobalt, and manganese of 1:1:1 or 5:2:3 can be used as the lithium nickel cobalt manganese oxide. In particular, a lithium nickel cobalt manganese oxide containing nickel and cobalt in an amount larger than that of manganese is preferably used in order to increase the positive electrode capacity.

(5) A solvent for the nonaqueous electrolyte used in the present invention is not limited, and a known solvent that has been used for nonaqueous electrolyte secondary batteries can be used. Examples of the solvent that can be used include cyclic carbonates such as ethylene carbonate, propylene carbonate, butylene carbonate, and vinylene carbonate; chain carbonates such as dimethyl carbonate, methylethyl carbonate, and diethyl carbonate; compounds containing an ester, such as methyl acetate, ethyl acetate, propyl acetate, methyl propionate, ethyl propionate, and γ-butyrolactone; compounds having a sulfonic group, such as propane sultone; compounds containing an ether, such as 1,2-dimethoxyethane, 1,2-diethoxyethane, tetrahydrofuran, 1,2-dioxane, 1,4-dioxane, and 2-methyltetrahydrofuran; compounds containing a nitrile, such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and compounds containing an amide, such as dimethylformamide. In particular, a solvent obtained by replacing some of hydrogen atoms of the above solvent with fluorine atoms is preferably used. These solvents may be used alone or in combination of two or more. In particular, a solvent obtained by combining a cyclic carbonate and a chain carbonate and a solvent obtained by combining the above solvent, a compound containing a small amount of nitrile, and a compound containing an ether are preferably used.

A known solute can be used as a solute for nonaqueous electrolyte. Examples of the solute include $LiPF_6$, $LiBF_4$, $LiN(SO_2CF_3)_2$, $LiN(SO_2C_2F_5)_2$, and $LiPF_{6-x}(C_nF_{2n-1})_x$ [$1<x<6$, $n=1$ or $2$]. These solutes may be used alone or as a mixture of two or more. The concentration of the solute is not particularly limited, but is preferably 0.8 to 1.5 mol per one liter of electrolyte.

(6) A known negative electrode can be used as the negative electrode in the present invention. In particular, the negative electrode is composed of a carbon material that can occlude and release lithium, a metal that can form an alloy with lithium, or an alloy compound containing the metal.

Examples of the carbon material include graphites such as natural graphite, non-graphitizable carbon, and synthetic graphite; and cokes. The alloy compound is, for example, a compound containing at least one of metals that can form an alloy with lithium. In particular, the element that can form an alloy with lithium is preferably silicon or tin, and silicon oxide or tin oxide, which is obtained by bonding silicon or tin to oxygen, can also be used. A mixture containing the above carbon material and a silicon compound or a tin compound can also be used.

In addition, although the energy density is decreased, a negative electrode material such as lithium titanate that provides a higher charge-discharge potential for metallic lithium than the carbon material or the like can also be used.

(7) A known separator can be used as the separator in the present invention. Specifically, not only a separator composed of polyethylene but also a separator including a polyethylene layer and a polypropylene layer formed on a surface of the polyethylene layer and a separator composed of polyethylene and having a surface coated with a resin such as an aramid resin may also be used.

EXAMPLES

First Example

A positive electrode for nonaqueous electrolyte secondary batteries and a battery according to the present invention will now be described. The positive electrode for nonaqueous electrolyte secondary batteries and the battery according to the present invention are not limited to those described below, and modifications and alterations can be suitably made without departing from the scope of the present invention.

Example 1

Production of Positive Electrode

First, 1000 g of lithium cobalt oxide particles that contain 1.5 mol % of Mg and 1.5 mol % of Al dissolved therein relative to the amount of lithium cobalt oxide and that also contain 0.05 mol % of Zr were prepared. The particles were added to 3.0 L of pure water and stirred to prepare a suspension in which the lithium cobalt oxide particles were dispersed. A solution prepared by dissolving 1.85 g of erbium nitrate pentahydrate [$Er(NO_3)_3 \cdot 5H_2O$] in 200 mL of pure water was then added to the suspension. Herein, 10% by mass of an aqueous nitric acid solution or 10% by mass of an aqueous sodium hydroxide solution was suitably added to adjust the pH of the solution in which the lithium cobalt oxide particles were dispersed to be 9.

After the completion of the addition of the erbium nitrate pentahydrate solution, suction filtration and then washing with water were performed to obtain a powder. The powder was dried at 120° C. to obtain the above-described lithium cobalt oxide having a surface to which an erbium hydroxide compound was partly adhered. The resultant powder was heat-treated in the air at 300° C. for 5 hours. When a heat treatment is performed at 300° C. in such a manner, all or most of the erbium hydroxide changes into erbium oxyhydroxide, which brings a state in which erbium oxyhydroxide is partly adhered to a surface of each positive electrode active material particle. Herein, erbium hydroxide may be partly adhered to a surface of each positive electrode active material particle because the erbium hydroxide may remain in the form of erbium hydroxide.

The obtained positive electrode active material was observed with a scanning electron microscope (SEM). Consequently, it was confirmed that an erbium compound having an average particle size of 100 nm or less was partly adhered to a surface of the positive electrode active material. The amount of the erbium compound adhered was also measured by ICP. The amount was 0.07% by mass relative to the amount of lithium cobalt oxide on an erbium element basis.

Subsequently, the lithium cobalt oxide having a surface to which an erbium compound was partly adhered and lithium nickel cobalt manganese oxide (including nickel, cobalt, and manganese at an equal ratio) were mixed with each other so that a mass ratio of 50:50 was satisfied. Thus, a positive electrode active material powder composed of two types of positive electrode active materials was prepared. The positive electrode active material powder, a carbon black (acetylene black) powder having an average particle size of 40 nm and serving as a positive electrode conductive agent, and polyvinylidene fluoride (PVdF) serving as a positive electrode binder were then kneaded in an NMP solution so that a mass ratio of 95:2.5:2.5 was satisfied. Thus, a positive electrode mixture slurry was prepared. Finally, the positive electrode mixture slurry was applied onto both surfaces of a positive electrode current collector composed of aluminum foil, dried, and then rolled with a rolling mill to produce a positive electrode in which positive electrode mixture layers were formed on both surfaces of the positive electrode current collector.

[Production of Negative Electrode]

First, synthetic graphite serving as a negative electrode active material, CMC (carboxymethylcellulose), and SBR (styrene-butadiene rubber) serving as a binder were mixed with each other in an aqueous solution at a mass ratio of 98:1:1 to prepare a negative electrode mixture slurry. Subsequently, the negative electrode mixture slurry was uniformly applied onto both surfaces of a negative electrode current collector composed of copper foil, dried, and then rolled with a rolling mill to produce a negative electrode in which negative electrode mixture layers were formed on both surfaces of the negative electrode current collector. The packing density of the negative electrode active material in the negative electrode was 1.70 $g/cm^3$.

[Preparation of Nonaqueous Electrolyte]

Lithium hexafluorophosphate ($LiPF_6$) was dissolved in a mixed solvent prepared by mixing ethylene carbonate (EC) and diethyl carbonate (DEC) at a volume ratio of 3:7, such that the concentration of the lithium hexafluorophosphate was 1.0 mol/L. Thus, a nonaqueous electrolyte was prepared.

[Production of Battery]

Lead terminals were attached to the positive electrode and the negative electrode. These electrodes were stacked so as to sandwich a separator therebetween and wound around a winding core in a spiral manner. Then, the winding core was pulled out to provide a spiral electrode body. This electrode body was compressed into a flat electrode body. Then, the flat electrode body and the nonaqueous electrolyte were put into an aluminum-laminate casing to prepare a flat nonaqueous electrolyte secondary battery having a structure shown in FIGS. 1 and 2. The secondary battery had a size of 3.6 mm×35 mm×62 mm. When the secondary battery was charged to 4.40 V and then discharged to 2.75 V, the discharge capacity was 750 mAh.

The thus-produced battery is hereinafter referred to as a battery A1.

Figure 2:
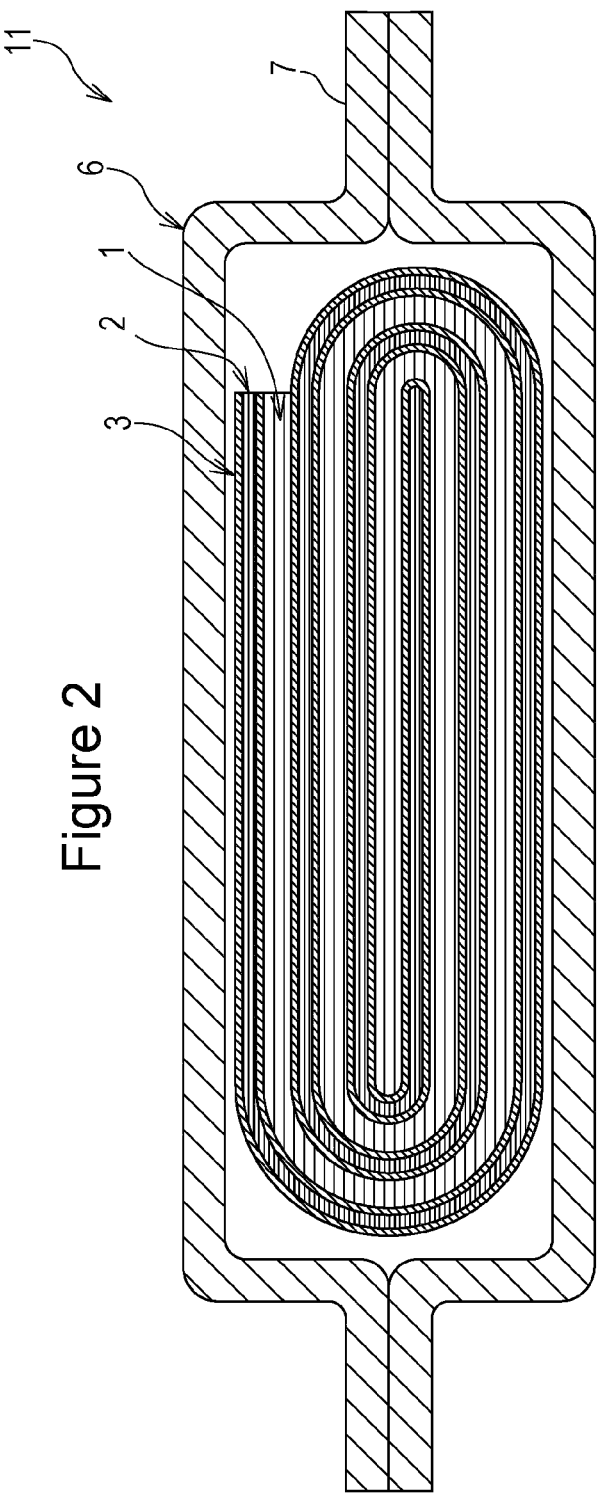
FIG. 2 is a sectional view taken along line A-A of FIG. 1.

FIGS. 1 and 2 show the specific structure of the nonaqueous electrolyte secondary battery 11. A positive electrode 1 and a negative electrode 2 are disposed so as to face each other with a separator 3 therebetween. The flat electrode body constituted by the positive electrode 1, the negative electrode 2, and the separator 3 is impregnated with the nonaqueous electrolyte. The positive electrode 1 and the negative electrode 2 are respectively connected to a positive electrode current collector tab 4 and a negative electrode current collector tab 5 so that a secondary battery structure allowing charging and discharging is provided. The electrode body is disposed within the space of an aluminum-laminate casing 6 having a sealed portion 7 formed by heat-sealing the peripheries together.

Example 2

A battery was produced in the same manner as in Example 1, except for use of a positive electrode active material prepared by mixing lithium cobalt oxide having a surface to which an erbium compound was partly adhered (hereinafter may be referred to as a surface-modified lithium cobalt oxide) and lithium nickel cobalt manganese oxide with each other at a mass ratio of 70:30.

The thus-produced battery is hereinafter referred to as a battery A2.

Example 3

A battery was produced in the same manner as in Example 1, except for use of a positive electrode active material prepared by mixing a surface-modified lithium cobalt oxide and lithium nickel cobalt manganese oxide with each other at a mass ratio of 80:20.

The thus-produced battery is hereinafter referred to as a battery A3.

Example 4

A battery was produced in the same manner as in Example 1, except for use of a positive electrode active material prepared by mixing a surface-modified lithium cobalt oxide and lithium nickel cobalt manganese oxide with each other at a mass ratio of 90:10.

The thus-produced battery is hereinafter referred to as a battery A4.

Example 5

A battery was produced in the same manner as in Example 1, except for use of a positive electrode active material prepared by mixing a surface-modified lithium cobalt oxide and lithium nickel cobalt manganese oxide with each other at a mass ratio of 95:5.

The thus-produced battery is hereinafter referred to as a battery A5.

Comparative Example 1

A battery was produced in the same manner as in Example 1, except that only a surface-modified lithium cobalt oxide was used as the positive electrode active material.

The thus-produced battery is hereinafter referred to as a battery Z1.

Comparative Example 2

A battery was produced in the same manner as in Example 1, except that only lithium cobalt oxide (lithium cobalt oxide having a surface to which an erbium compound was not adhered, which may be hereinafter referred to as a surface-unmodified lithium cobalt oxide) was used as the positive electrode active material.

The thus-produced battery is hereinafter referred to as a battery Z2.

Comparative Example 3

A battery was produced in the same manner as in Example 1, except that only lithium nickel cobalt manganese oxide was used as the positive electrode active material.

The thus-produced battery is hereinafter referred to as a battery Z3.

Comparative Example 4

A battery was produced in the same manner as in Example 1, except that a positive electrode active material prepared by mixing a surface-unmodified lithium cobalt oxide and lithium nickel cobalt manganese oxide with each other at a mass ratio of 50:50 was used.

The thus-produced battery is hereinafter referred to as a battery Z4.

Comparative Example 5

A battery was produced in the same manner as in Example 1, except that a positive electrode active material prepared by mixing a surface-unmodified lithium cobalt oxide and lithium nickel cobalt manganese oxide with each other at a mass ratio of 70:30 was used.

The thus-produced battery is hereinafter referred to as a battery Z5.

Comparative Example 6

A battery was produced in the same manner as in Example 1, except that a positive electrode active material prepared by mixing a surface-unmodified lithium cobalt oxide and lithium nickel cobalt manganese oxide with each other at a mass ratio of 90:10 was used.

The thus-produced battery is hereinafter referred to as a battery Z6.

Experiment 1

The batteries A1 to A5 and Z1 to Z6 were charged and discharged under the following conditions, and the remaining capacity percentage and average discharge voltage after continuous charging at 60° C. were measured. Table 1 shows the results.

[First-Cycle Charging-Discharging Conditions]

First-Cycle Charging Conditions

Each battery was charged at a constant current of 1.0 It (750 mA) until the voltage of the battery reached 4.40 V and then charged at a constant voltage of 4.40 V until the current of the battery reached 37.5 mA.

First-Cycle Discharging Conditions

Each battery was discharged at a constant current of 1.0 It (750 mA) until the voltage of the battery reached 2.75 V.

Pause

The pause between the charging and the discharging was 10 minutes.

[Charging Conditions During Continuous Charging at 60° C.]

Each battery was subjected to a charging-discharging cycle test once under the above conditions and the discharge capacity Q1 (discharge capacity Q1 before a continuous charging test) was measured. Then, the battery was left in a thermostat oven at 60° C. for one hour. Subsequently, in the environment at 60° C., the battery was charged at a constant current of 1.0 It (750 mA) until the voltage of the battery reached 4.40 V and further charged at a constant voltage of 4.40 V for 64 hours.

[Measurement of Remaining Capacity Percentage]

After each battery was cooled to room temperature, the first discharge capacity Q2 after the continuous charging test was measured at room temperature under the same conditions as the first-cycle discharging conditions. The remaining capacity percentage was calculated from the following formula (1).

$$\text{Remaining capacity percentage} = (\text{first discharge capacity } Q2 \text{ after continuous charging test/discharge capacity } Q1 \text{ before continuous charging test}) \times 100 (\%) \quad (1)$$

[Measurement of Average Discharge Voltage after Continuous Charging Test]

The discharge capacity Q2 after the continuous charging test was measured, and then the battery was subjected to the charging-discharging cycle test once at room temperature under the same conditions as the first-cycle charging-discharging conditions to measure the average discharge voltage. The discharge voltage at half of the discharge capacity Q2 obtained in the measurement of the remaining capacity percentage was defined as the average discharge voltage.

TABLE 1

| Type of battery | Positive electrode active material: lithium cobalt oxide | | Positive electrode active material: lithium nickel cobalt manganese oxide | | Remaining capacity percentage (%) | Average discharge voltage (V) |
|---|---|---|---|---|---|---|
| | Adhered element | Mixing ratio (mass %) | Adhered element | Mixing ratio (mass %) | | |
| Battery A1 | Er | 50 | none | 50 | 89.4 | 3.70 |
| Battery A2 | | 70 | | 30 | 90.6 | 3.70 |
| Battery A3 | | 80 | | 20 | 90.8 | 3.74 |
| Battery A4 | | 90 | | 10 | 90.1 | 3.72 |
| Battery A5 | | 95 | | 5 | 90.0 | 3.72 |
| Battery Z1 | | 100 | — | 0 | 86.4 | 3.70 |
| Battery Z2 | none | 100 | — | 0 | 71.6 | 3.43 |
| Battery Z3 | — | 0 | none | 100 | 85.8 | 3.55 |
| Battery Z4 | none | 50 | | 50 | 84.5 | 3.50 |
| Battery Z5 | | 70 | | 30 | 78.7 | 3.45 |
| Battery Z6 | | 90 | | 10 | 71.7 | 3.40 |

As is clear from Table 1, the batteries A1 to A5 that use the positive electrode active material prepared by mixing the surface-modified lithium cobalt oxide and lithium nickel cobalt manganese oxide (i.e., mixing the positive electrode active material of the battery Z1 and the positive electrode active material of the battery Z3) have a remaining capacity percentage higher than and an average discharge voltage equal to or higher than those of the battery Z1 that uses the surface-modified lithium cobalt oxide alone as the positive electrode active material and the battery Z3 that uses lithium nickel cobalt manganese oxide alone as the positive electrode active material. In other words, both the characteristics of the batteries A1 to A5 do not lie within the range of each characteristic of the battery Z1 and battery Z3, but lie beyond the range of each characteristic (e.g., the battery Z1 has a remaining capacity percentage of 86.4% and the battery Z3 has a remaining capacity percentage of 85.8% and thus the batteries A1 to A5 produced by mixing the positive electrode active material of the battery Z1 and the positive electrode active material of the battery Z3 are assumed to have a remaining capacity percentage of 85.8% to 86.4%, but in fact, the batteries A1 to A5 have a remaining capacity percentage of 89.4% or more, which is beyond the expected range). This may be because a combined effect is produced by mixing two types of positive electrode active materials.

In contrast, the batteries Z4 to Z6 that use the positive electrode active material prepared by mixing lithium cobalt oxide having a surface to which an erbium compound is not adhered (hereinafter may be referred to as a surface-unmodified lithium cobalt oxide) and lithium nickel cobalt manganese oxide (i.e., mixing the positive electrode active material of the battery Z2 and the positive electrode active material of the battery Z3) have a remaining capacity percentage and average discharge voltage higher than those of the battery Z2 that uses the surface-unmodified lithium cobalt oxide alone as the positive electrode active material, but has a remaining capacity percentage and average discharge voltage lower than those of the battery Z3 that uses lithium nickel cobalt manganese oxide alone as the positive electrode active material. In other words, both the characteristics of the batteries Z4 to Z6 only lie within the range of each characteristic of the battery Z2 and battery Z3. Therefore, in the cases of the batteries Z4 to Z6, a combined effect due to two types of positive electrode active materials mixed with each other is not produced unlike the cases of the batteries A1 to A5.

It is believed that the above-described experimental results were obtained because of the reason below. That is, in the batteries A1 to A5, the catalytic performance of cobalt in the lithium cobalt oxide is degraded due to the presence of an erbium compound. Because of the effect of the degraded catalytic performance on lithium nickel cobalt manganese oxide, an effect of suppressing the elution of nickel, cobalt, and manganese is produced. Furthermore, as a result of suppressing the activation of the lithium nickel cobalt manganese oxide in such a manner, the activation of the lithium cobalt oxide can be further suppressed and thus the decomposition of an electrolyte can be further suppressed. Such a combined effect can suppress the formation of an inactive layer on the surface of the positive electrode active material. Consequently, the discharge performance is believed to be markedly improved. In contrast, it is believed that, since the batteries Z4 to Z6 do not contain an erbium compound, such a combined effect is not produced and thus the discharge characteristics are not improved.

As is clear from the comparison among the batteries A1 to A5, the batteries A2 to A5 particularly have an improved remaining capacity percentage compared with the battery A1 and also have an average discharge voltage higher than that of the battery A1. Therefore, the mass ratio of the surface-modified lithium cobalt oxide and the lithium nickel cobalt manganese oxide mixed with each other is particularly preferably limited to 95:5 to 70:30.

Second Example

In Second Example, the case where an erbium compound was partly adhered to not only the surface of the lithium cobalt oxide but also the surface of the lithium nickel cobalt manganese oxide was examined.

Example 1

A battery was produced in the same manner as in Example 1 of First Example, except that an erbium compound was also partly adhered to the surface of the lithium nickel cobalt manganese oxide (hereinafter may be referred to as a surface-modified lithium nickel cobalt manganese oxide). The surface-modified lithium nickel cobalt manganese oxide was prepared by the same method as that for preparing the surface-modified lithium cobalt oxide. The amount of the erbium compound adhered was measured by ICP. The amount was 0.07% by mass relative to the amount of lithium nickel cobalt manganese oxide on an erbium element basis.

The thus-produced battery is hereinafter referred to as a battery B1.

Example 2

A battery was produced in the same manner as in Example 1, except that a positive electrode active material prepared by mixing the surface-modified lithium cobalt oxide and the surface-modified lithium nickel cobalt manganese oxide at a mass ratio of 90:10 was used.

The thus-produced battery is hereinafter referred to as a battery B2.

Experiment

Regarding the batteries B1 and B2, the remaining capacity percentage and average discharge voltage after continuous charging at 60° C. were measured in the same manner as in Experiment of First Example. Table 2 shows the results. Table 2 also shows the results of the batteries A1 and A4.

TABLE 2

| Type of battery | Positive electrode active material: lithium cobalt oxide | | Positive electrode active material: lithium nickel cobalt manganese oxide | | Remaining capacity percentage (%) | Average discharge voltage (V) |
|---|---|---|---|---|---|---|
| | Adhered element | Mixing ratio (mass %) | Adhered element | Mixing ratio (mass %) | | |
| Battery B1 | Er | 50 | Er | 50 | 92.1 | 3.70 |
| Battery B2 | Er | 90 | Er | 10 | 90.9 | 3.73 |
| Battery A1 | Er | 50 | none | 50 | 89.4 | 3.70 |
| Battery A4 | Er | 90 | | 10 | 90.1 | 3.72 |

As is clear from Table 2, in the batteries B1 and B2 that use the surface-modified lithium nickel cobalt manganese oxide, at least one of the remaining capacity percentage and average discharge voltage is further improved compared with the batteries A1 and A4 that use the surface-unmodified lithium nickel cobalt manganese oxide (lithium nickel cobalt manganese oxide having a surface to which an erbium compound is not adhered). Therefore, when the erbium compound is partly adhered to not only the surface of the lithium cobalt oxide but also the surface of the lithium nickel cobalt manganese oxide, the remaining capacity percentage and average operating voltage can be further improved.

This may be because an effect of suppressing the decomposition of an electrolyte is produced on the surface of the lithium nickel cobalt manganese oxide by also partly adhering an erbium compound on the surface of the lithium nickel cobalt manganese oxide. However, the effect is not so large. It is believed that an essential effect of improving the remaining capacity percentage and average discharge voltage is mainly produced due to the erbium compound partly adhered to the surface of the lithium cobalt oxide.

Third Example

In Third Example, the type of rare-earth element partly adhered to the surface of the lithium cobalt oxide was examined.

Example 1

A battery was produced in the same manner as in Example 3 of First Example, except that, instead of the erbium compound, a samarium compound was partly adhered to the surface of the lithium cobalt oxide (the mass ratio of the lithium cobalt oxide surface-modified with a samarium compound and the lithium nickel cobalt manganese oxide was 80:20). The lithium cobalt oxide surface-modified with a samarium compound was prepared by the same method as that for preparing the lithium cobalt oxide surface-modified with the erbium compound, except that samarium nitrate hexahydrate was used instead of the erbium nitrate pentahydrate. The amount of the samarium compound adhered was measured by ICP. The amount was 0.07% by mass relative to the amount of lithium cobalt oxide on a samarium element basis.

The thus-produced battery is hereinafter referred to as a battery C1.

Example 2

A battery was produced in the same manner as in Example 3 of First Example, except that, instead of the erbium compound, a neodymium compound was partly adhered to the surface of the lithium cobalt oxide (the mass ratio of the lithium cobalt oxide surface-modified with a neodymium compound and the lithium nickel cobalt manganese oxide was 80:20). The lithium cobalt oxide surface-modified with a neodymium compound was prepared by the same method as that for preparing the lithium cobalt oxide surface-modified with the erbium compound, except that neodymium nitrate hexahydrate was used instead of the erbium nitrate pentahydrate. The amount of the neodymium compound adhered was measured by ICP. The amount was 0.07% by mass relative to the amount of lithium cobalt oxide on a neodymium element basis.

The thus-produced battery is hereinafter referred to as a battery C2.

Example 3

A battery was produced in the same manner as in Example 3 of First Example, except that, instead of the erbium compound, a lanthanum compound was partly adhered to the surface of the lithium cobalt oxide (the mass ratio of the lithium cobalt oxide surface-modified with a lanthanum compound and the lithium nickel cobalt manganese oxide was 80:20). The lithium cobalt oxide surface-modified with a lanthanum compound was prepared by the same method as that for preparing the lithium cobalt oxide surface-modified with the erbium compound, except that lanthanum nitrate hexahydrate was used instead of the erbium nitrate pentahydrate. The amount of the lanthanum compound adhered was measured by ICP. The amount was 0.07% by mass relative to the amount of lithium cobalt oxide on a lanthanum element basis.

The thus-produced battery is hereinafter referred to as a battery C3.

Comparative Example 1

A battery was produced in the same manner as in Example 1, except that only the lithium cobalt oxide surface-modified with the samarium compound was used as the positive electrode active material.

The thus-produced battery is hereinafter referred to as a battery Y1.

Comparative Example 2

A battery was produced in the same manner as in Example 2, except that only the lithium cobalt oxide surface-modified with the neodymium compound was used as the positive electrode active material.

The thus-produced battery is hereinafter referred to as a battery Y2.

Comparative Example 3

A battery was produced in the same manner as in Example 3, except that only the lithium cobalt oxide surface-modified with the lanthanum compound was used as the positive electrode active material.

The thus-produced battery is hereinafter referred to as a battery Y3.

Experiment

Regarding the batteries C1 to C3 and Y1 to Y3, the remaining capacity percentage and average discharge voltage after continuous charging at 60° C. were measured in the same manner as in Experiment of First Example. Table 3 shows the results. Table 3 also shows the results of the batteries A3 and Z1 to Z3.

TABLE 3

| Type of battery | Positive electrode active material: lithium cobalt oxide | | Positive electrode active material: lithium nickel cobalt manganese oxide | | Remaining capacity percentage (%) | Average discharge voltage (V) |
|---|---|---|---|---|---|---|
| | Adhered element | Mixing ratio (mass %) | Adhered element | Mixing ratio (mass %) | | |
| Battery C1 | Sm | 80 | none | 20 | 90.2 | 3.69 |
| Battery Y1 | | 100 | — | 0 | 86.2 | 3.66 |
| Battery C2 | Nd | 80 | none | 20 | 90.0 | 3.71 |
| Battery Y2 | | 100 | — | 0 | 86.0 | 3.68 |
| Battery C3 | La | 80 | none | 20 | 88.1 | 3.68 |
| Battery Y3 | | 100 | — | 0 | 85.9 | 3.64 |
| Battery A3 | Er | 80 | none | 20 | 90.8 | 3.74 |
| Battery Z1 | | 100 | — | 0 | 86.4 | 3.70 |
| Battery Z2 | none | 100 | — | 0 | 71.6 | 3.43 |
| Battery Z3 | — | 0 | none | 100 | 85.8 | 3.55 |

As is clear from Table 3, the batteries C1 to C3 that use the positive electrode active material prepared by mixing the surface-modified lithium cobalt oxide having a surface on which, instead of the erbium compound, the samarium compound, neodymium compound, or lanthanum compound is partly adhered and the lithium nickel cobalt manganese oxide have a remaining capacity percentage higher than and an average discharge voltage equal to or higher than those of the batteries Y1 to Y3 that respectively use the surface-modified lithium cobalt oxides corresponding to the batteries C1 to C3 and the battery Z3 that uses the lithium nickel cobalt manganese oxide alone as the positive electrode active material. In other words, as in the case where the erbium compound is partly adhered to the surface of the lithium cobalt oxide, both the characteristics of the batteries C1 to C3 do not lie within the range of each characteristic of the batteries Y1 to Y3 and battery Z3, but lie beyond the range of each characteristic. This may be because of the same reason as that described in Experiment of First Example.

It is clear from the above results that the same effect as in the case of the erbium compound is produced even when the samarium compound, neodymium compound, or lanthanum compound is used. This effect can be regarded as a common effect in rare-earth compounds.

It is confirmed from the comparison among the batteries C1 to C3 and the battery A3 that the batteries C1, C2, and A3 have a remaining capacity percentage and average discharge voltage higher than those of the battery C3 and, in particular, the battery A3 has the highest remaining capacity percentage and average discharge voltage. This makes it clear that a rare-earth element having an atomic number larger than that of neodymium among rare-earth elements is preferably used, and erbium is particularly preferably used.

Fourth Example

In Fourth Example, the case where an inorganic particle layer containing inorganic particles was formed on the surface of the positive electrode or the surface of the negative electrode was examined.

Example 1

A battery was produced in the same manner as in Example 1 of First Example, except that an inorganic particle layer was formed on the surface of the positive electrode (positive electrode mixture layer) by the following method. The inorganic particle layer was formed by preparing an aqueous slurry containing alumina (AKP 3000 manufactured by Sumitomo Chemical Company, Limited), SBR (styrene-butadiene rubber) serving as an aqueous binder, and CMC (carboxymethylcellulose) serving as a dispersing agent (the mass ratio of the alumina and the aqueous binder was 100:3), applying the aqueous slurry onto the surface of the positive electrode by a dipping process, and then drying the aqueous slurry at 90° C. for 10 minutes. The thickness of the inorganic particle layer measured with a micrometer was 4 μm.

The thus-produced battery is hereinafter referred to as a battery D1.

Example 2

A battery was produced in the same manner as in Example 1 of First Example, except that an inorganic particle layer was formed on the surface of the negative electrode (negative electrode mixture layer) by the following method. The inorganic particle layer was formed by preparing a slurry that uses an NMP solution prepared by dispersing titania (CR-EL manufactured by ISHIHARA SANGYO KAISHA, LTD.) and an ethyl acrylate-acrylonitrile copolymer (the mass ratio of the titania and the ethyl acrylate-acrylonitrile copolymer was 100:3), applying the slurry onto the surface of the negative electrode by a dipping process, and then drying the slurry at 90° C. for 10 minutes. The thickness of the inorganic particle layer measured with a micrometer was 4 μm.

The thus-produced battery is hereinafter referred to as a battery D2.

Regarding the invention batteries D1 and D2, the remaining capacity percentage and average discharge voltage after continuous charging at 60° C. were measured in the same manner as in Experiment of First Example. Table 4 shows the results. Table 4 also shows the results of the battery A1.

the electrolyte and the negative electrode active material, which can further suppress the decomposition of the electrolyte.

It is also clear from the comparison between the battery D1 and the battery D2 that the remaining capacity percentage and average discharge voltage of the battery D1 produced by forming the inorganic particle layer on the surface of the positive electrode are further improved. Therefore, the remaining capacity percentage and average discharge voltage can be further improved by forming the inorganic particle layer on the surface of the positive electrode rather than by forming the inorganic particle layer on the surface of the negative electrode. This may be because, since the amount of electrolyte decomposed is larger on the surface of the positive electrode active material than on the surface of the negative electrode active material, the decomposition of the electrolyte can be more effectively suppressed by forming the inorganic particle layer on the surface of the positive electrode.

Fifth Example

In Fifth Example, the case where the inorganic particle layer was formed on the surface of the positive electrode containing a positive electrode active material other than the positive electrode active material used in Fourth Example.

Example 1

A battery was produced in the same manner as in Example 1 of Second Example, except that an inorganic particle layer

TABLE 4

| | Positive electrode active material: lithium cobalt oxide | | Positive electrode active material: lithium nickel cobalt manganese oxide | | Inorganic particle layer (position) | Remaining capacity percentage (%) | Average discharge voltage (V) |
| --- | --- | --- | --- | --- | --- | --- | --- |
| | Adhered element | Mixing ratio (mass %) | Adhered element | Mixing ratio (mass %) | | | |
| Battery A1 | Er | 50 | none | 50 | absence | 89.4 | 3.70 |
| Battery D1 | | | | | presence (positive electrode) | 92.7 | 3.72 |
| Battery D2 | | | | | presence (negative electrode) | 90.8 | 3.71 |

As is clear from Table 4, in the batteries D1 and D2 produced by forming an inorganic particle layer on the surface of the positive electrode (positive electrode mixture layer) or the surface of the negative electrode (negative electrode mixture layer), the remaining capacity percentage and average discharge voltage are further improved compared with the battery A1 produced without forming an inorganic particle layer on the surface of the positive or negative electrode. Therefore, the remaining capacity percentage and average operating voltage can be further improved by the formation of the inorganic particle layer on the surface of the positive or negative electrode, in addition to the surface modification of the positive electrode active material.

This may be because the presence of the inorganic particle layer formed on the surface of the positive or negative electrode further suppresses the contact between the electrolyte and the positive electrode active material or between was formed on the surface of the positive electrode by the same method as in Example 1 of Fourth Example.

The thus-produced battery is hereinafter referred to as a battery E1.

Example 2

A battery was produced in the same manner as in Example 2 of Second Example, except that an inorganic particle layer was formed on the surface of the positive electrode by the same method as in Example 1 of Fourth Example.

The thus-produced battery is hereinafter referred to as a battery E2.

Example 3

A battery was produced in the same manner as in Example 4 of First Example, except that an inorganic particle layer was formed on the surface of the positive electrode by the same method as in Example 1 of Fourth Example.

The thus-produced battery is hereinafter referred to as a battery E3.

Regarding the batteries E1 to E3, the remaining capacity percentage and average discharge voltage after continuous charging at 60° C. were measured in the same manner as in Experiment of First Example. Table 5 shows the results. Table 5 also shows the results of the batteries A1, A4, B1, B2, and D1.

prepared by partly adhering the erbium compound not only the surface of the lithium cobalt oxide but also the surface of the lithium nickel cobalt manganese oxide, and the batteries C1 to C3 in which the compounds adhered to the surface of the lithium cobalt oxide are the samarium compound, neodymium compound, and lanthanum compound, the same effect as above is believed to be produced by forming the inorganic particle layer on the surface of the positive electrode. Furthermore, it is also believed that the same effect is produced even when a rare-earth compound

TABLE 5

| | Positive electrode active material: lithium cobalt oxide | | Positive electrode active material: lithium nickel cobalt manganese oxide | | | Remaining | Average |
|---|---|---|---|---|---|---|---|
| | Adhered element | Mixing ratio (mass %) | Adhered element | Mixing ratio (mass %) | Inorganic particle layer | capacity percentage (%) | discharge voltage (V) |
| Battery B1 | Er | 50 | Er | 50 | absence | 92.1 | 3.70 |
| Battery E1 | | | | | presence | 94.1 | 3.72 |
| Battery B2 | | 90 | | 10 | absence | 90.9 | 3.73 |
| Battery E2 | | | | | presence | 93.9 | 3.75 |
| Battery A1 | | 50 | none | 50 | absence | 89.4 | 3.70 |
| Battery D1 | | | | | presence | 92.7 | 3.72 |
| Battery A4 | | 90 | | 10 | absence | 90.1 | 3.72 |
| Battery E3 | | | | | presence | 93.5 | 3.74 |

As is clear from Table 5, in the batteries E1 to E3 produced by forming the inorganic particle layer on the surface of the positive electrode (positive electrode mixture layer), the remaining capacity percentage and average discharge voltage are further improved compared with the batteries B1, B2, and A4 produced without forming the inorganic particle layer on the surface of the positive electrode. Therefore, the remaining capacity percentage and average operating voltage can be further improved by the formation of the inorganic particle layer on the surface of the positive electrode, in addition to the surface modification of the positive electrode active material.

This may be because the presence of the inorganic particle layer formed on the surface of the positive electrode further suppresses the contact between the electrolyte and the positive electrode active material, which can further suppress the decomposition of the electrolyte.

As is also clear from Table 5, an effect of the inorganic particle layer formed on the surface of the positive electrode is equally produced regardless of the mixing ratio of positive electrode active materials and the presence or absence of an element adhered to the lithium nickel cobalt manganese oxide. Therefore, it is believed that, in addition to the effect of the adhered element on the surface of the positive electrode active material, the effect of the inorganic particle layer formed is obviously produced.

Accordingly, also in the cases of the batteries A2, A3, and A5 having positive-electrode-active-material mixing ratios different from those of the batteries A1 and A4, the batteries B1 and B2 that use the positive electrode active material other than the erbium compound, samarium compound, and the like shown in Third Example is adhered to the surface of the lithium cobalt oxide.

INDUSTRIAL APPLICABILITY

The present invention can be expected to be applied to driving power sources for portable information terminals such as cellular phones, laptop computers, and PDAs and high-output driving power sources for HEVs and power tools.

REFERENCE SIGNS LIST 1 positive electrode
2 negative electrode
3 separator
4 positive electrode current collector tab
5 negative electrode current collector tab
6 aluminum-laminate casing
21 lithium cobalt oxide particle
22 rare-earth compound particle

The invention claimed is:
1. A positive electrode for nonaqueous electrolyte secondary batteries, comprising:
    a positive electrode active material composed of a mixture containing (i) lithium cobalt oxide particles having a surface to which rare-earth compound particles are partly adhered, and (ii) lithium nickel cobalt manganese oxide particles; and a binder, wherein the content of the lithium nickel cobalt manganese oxide is 1% by mass or more and 50% by mass or less relative to the total amount of the positive electrode active material, wherein the amount of the rare-earth compound particles adhered to the surface of the lithium cobalt oxide particles is 0.01% by mass or more and 0.5% by mass or less relative to the amount of the lithium oxide particles on a rare-earth element basis, wherein the rare-earth compound particles have an average particle size of 100 nm or less and 0.1 nm or more, and wherein the rare-earth compound particles are at least one selected from the group consisting of rare-earth hydroxides, rare-earth oxyhydroxides, and rare-earth carbonate compounds.

2. The positive electrode for nonaqueous electrolyte secondary batteries according to claim 1, wherein the content of the lithium nickel cobalt manganese oxide particles is 3% by mass or more and 30% by mass or less relative to the total amount of the positive electrode active material.

3. The positive electrode for nonaqueous electrolyte secondary batteries according to claim 1, wherein the content of the lithium nickel cobalt manganese oxide particles is 5% by mass or more and 20% by mass or less relative to the total amount of the positive electrode active material.

4. The positive electrode for nonaqueous electrolyte secondary batteries according to claim 1, wherein the lithium nickel cobalt manganese oxide particles have a surface to which rare-earth compound particles are partly adhered.

5. The positive electrode for nonaqueous electrolyte secondary batteries according to claim 4, wherein a rare-earth element of the rare-earth compound particles is at least one element selected from erbium, neodymium, samarium, and lanthanum.

6. The positive electrode for nonaqueous electrolyte secondary batteries according to claim 1, wherein a rare-earth element of the rare-earth compound particles is at least one element selected from erbium, neodymium, samarium, and lanthanum.

7. A nonaqueous electrolyte secondary battery, comprising:
the positive electrode for nonaqueous electrolyte secondary batteries according to claim 1,
a negative electrode containing a negative electrode active material, and
a separator disposed between both the electrodes and impregnated with an electrolyte.

8. The nonaqueous electrolyte secondary battery according to claim 7, wherein an inorganic particle layer containing inorganic particles is formed between the separator and the positive electrode for nonaqueous electrolyte secondary batteries.

9. The nonaqueous electrolyte secondary battery according to claim 8, wherein the inorganic particle layer is formed on a surface of the positive electrode for nonaqueous electrolyte secondary batteries.

10. The nonaqueous electrolyte secondary battery according to claim 8, wherein an inorganic particle layer containing inorganic particles is formed between the separator and the negative electrode.

11. The nonaqueous electrolyte secondary battery according to claim 7, wherein an inorganic particle layer containing inorganic particles is formed between the separator and the negative electrode.

12. The nonaqueous electrolyte secondary battery according to claim 11, wherein the inorganic particle layer is formed on a surface of the negative electrode.

13. The positive electrode for nonaqueous electrolyte secondary batteries according to claim 1, wherein no rare-earth compound particle is adhered to any surface of the lithium nickel cobalt manganese oxide particles.

* * * * *